United States Patent [19]
Saitoh et al.

[11] Patent Number: 5,870,224
[45] Date of Patent: Feb. 9, 1999

[54] LENTICULAR SHEET, REAR-PROJECTION SCREEN OR TV USING THE SAME, AND FABRICATION METHOD FOR SAID LENTICULAR SHEET

[75] Inventors: Goro Saitoh; Teruo Suzuki; Takashi Abe; Kazuyoshi Ebina, all of Tokyo, Japan

[73] Assignee: Toppan Printing Company Limited, Tokyo, Japan

[21] Appl. No.: 735,921

[22] Filed: Oct. 24, 1996

[30]    Foreign Application Priority Data

| Oct. 25, 1995 | [JP] | Japan | 7-277484 |
| Feb. 2, 1996 | [JP] | Japan | 8-017482 |

[51] Int. Cl.[6] .................................................. G03R 27/56
[52] U.S. Cl. ........................................... 359/456; 359/455
[58] Field of Search .................................. 359/443, 455, 359/456, 457, 460

[56]    References Cited

U.S. PATENT DOCUMENTS

| 4,165,154 | 8/1979 | Takahashi | 350/128 |
| 4,408,837 | 10/1983 | Kozaki et al. | 350/336 |
| 4,666,248 | 5/1987 | van de Ven | 350/128 |
| 4,721,361 | 1/1988 | Van De Ven | 350/128 |
| 5,066,099 | 11/1991 | Yoshida et al. | 359/457 |
| 5,184,224 | 2/1993 | Mtani et al. | 358/231 |
| 5,191,472 | 3/1993 | Kurematsu et al. | 359/619 |
| 5,668,662 | 9/1997 | Magocs et al. | 359/452 |

FOREIGN PATENT DOCUMENTS

| 56-117225 | 9/1981 | Japan . | |
| 56-162619 | 12/1981 | Japan . | |
| 56-164826 | 12/1981 | Japan . | |
| 59-88723 | 5/1984 | Japan . | |
| 60-17434 | 1/1985 | Japan . | |
| 63134227 A | 6/1988 | Japan | B29D 11/00 |
| 1-86102 | 3/1989 | Japan . | |
| 5-119205 | 5/1993 | Japan . | |
| 07159902 A | 6/1995 | Japan | G03B 21/62 |

OTHER PUBLICATIONS

Article by Law et al., entitled "Projection Screens for Home Television Receivers" published by *Journal of the Optical Society of America,* vol. 38, No. 6, Jun. 1948, pp. 497–502.

Background material entitled "Projection TV Systems," pp. 4–10–4–14.

*Primary Examiner*—Daniel P. Malley
*Attorney, Agent, or Firm*—Graham & James LLP

[57]    ABSTRACT

The present invention provides a lenticular sheet in which cylindrical lens parts including a radiation curable resin are formed on one side of a transparent support, and at least a light-diffusing layer and light-blocking stripes are formed on the flat surface located on the opposite side of said sheet. Cylindrical lens parts with a fine pitch of 0.3 mm or less can be obtained; furthermore, finely pitched light-blocking stripes can be accurately formed in the desired positions.

A projection screen constructed by combining the aforementioned lenticular sheet with a Fresnel lens sheet is ideally suited for viewing a liquid crystal projection TV with a high image definition.

18 Claims, 5 Drawing Sheets

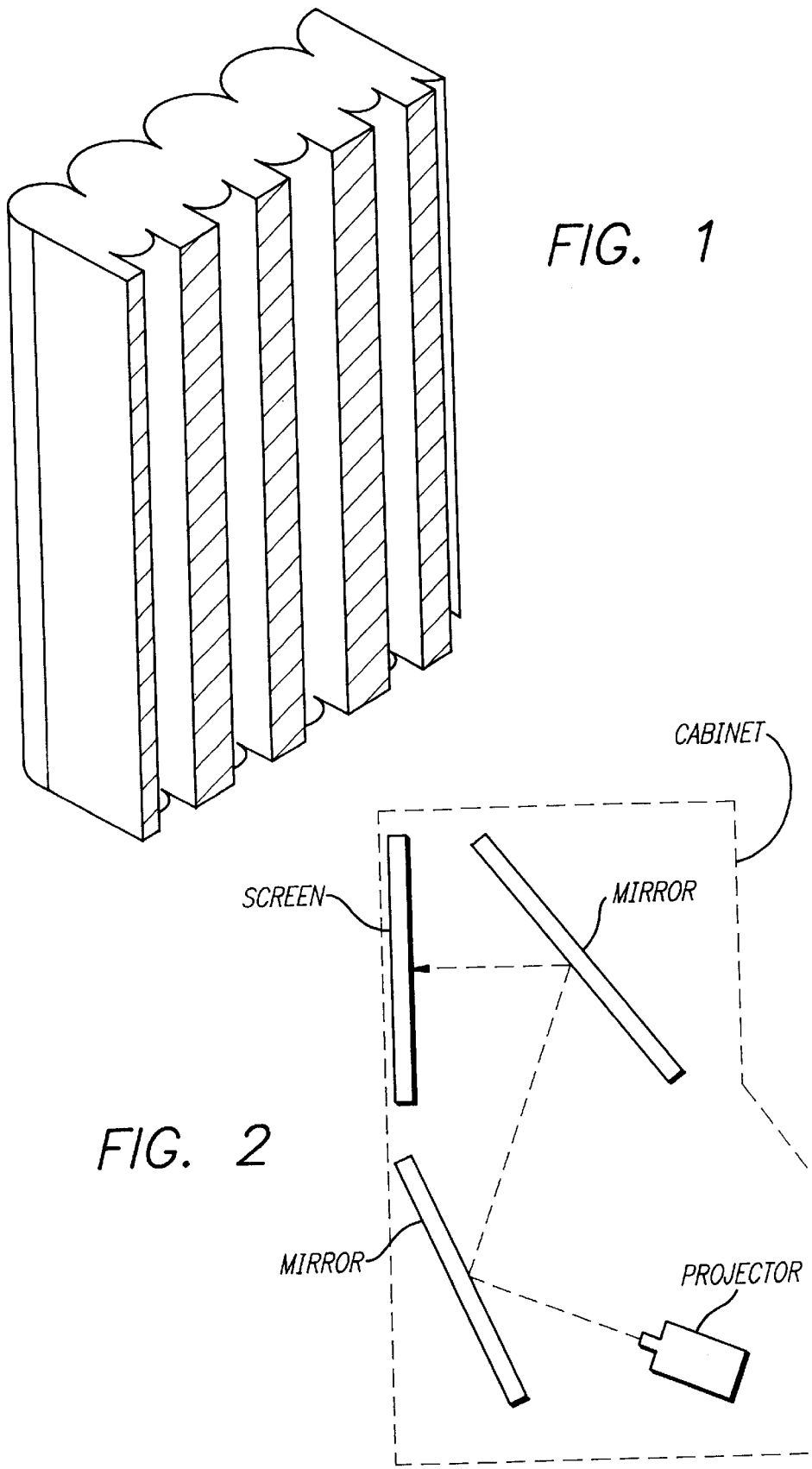

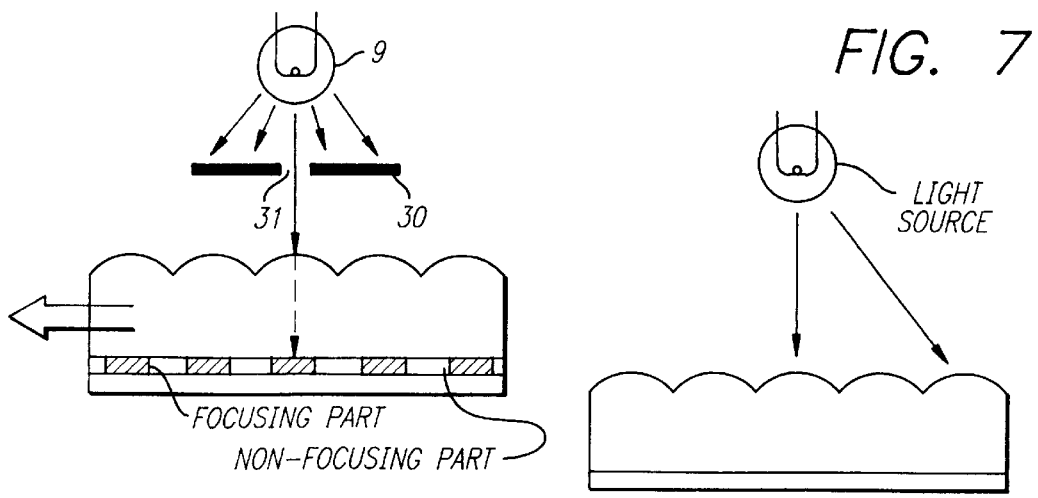
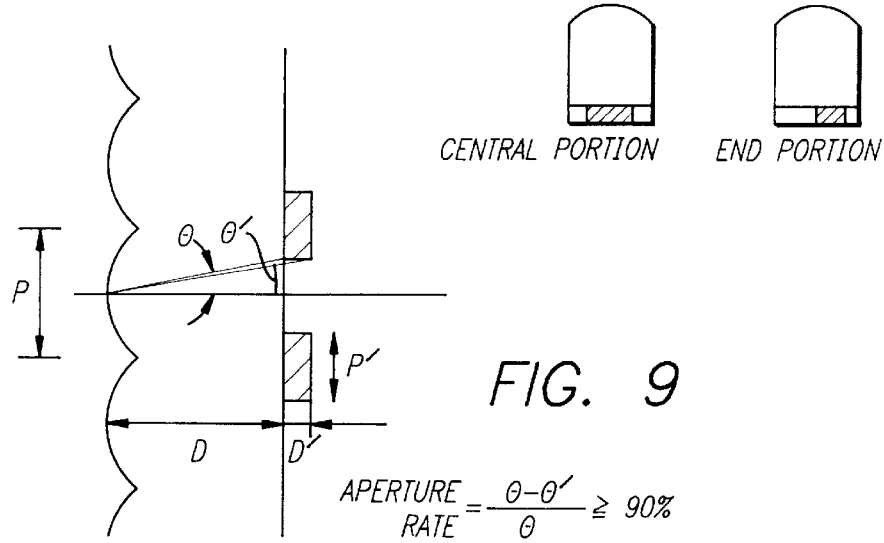
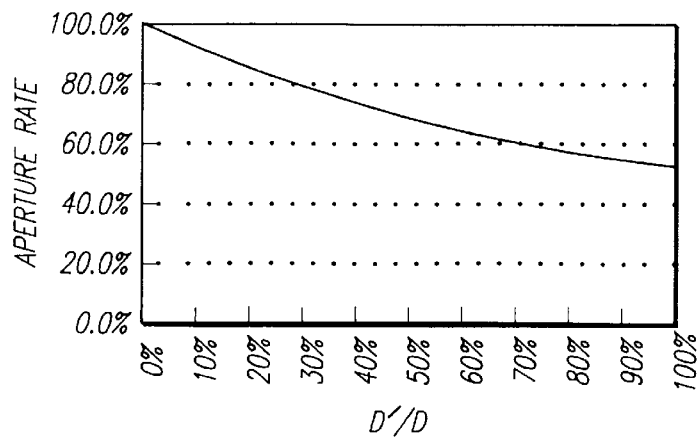

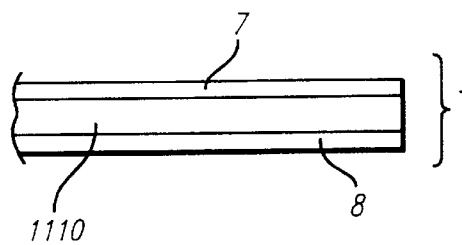
FIG. 11
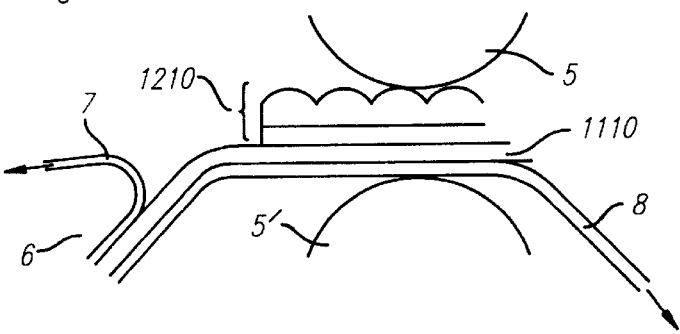
FIG. 12
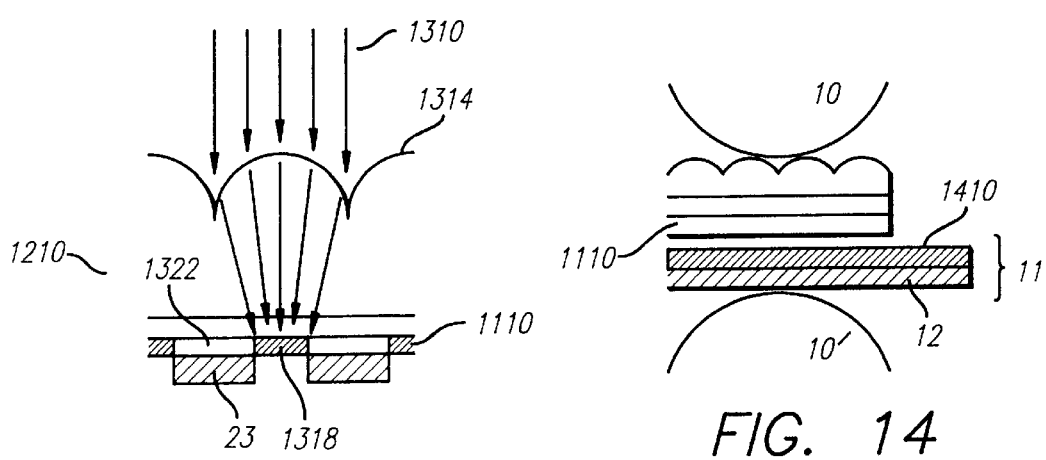
FIG. 13
FIG. 14
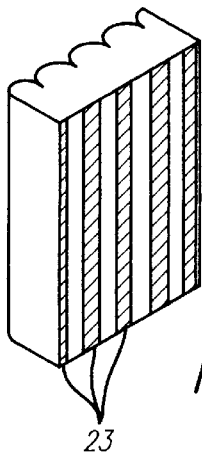
FIG. 15
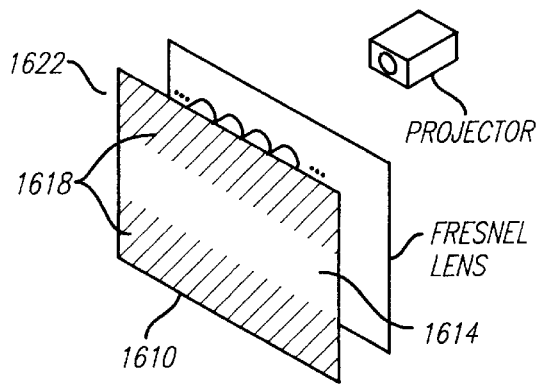
FIG. 16

LENTICULAR SHEET, REAR-PROJECTION SCREEN OR TV USING THE SAME, AND FABRICATION METHOD FOR SAID LENTICULAR SHEET

RELATED APPLICATIONS

The following related Japanese applications are hereby incorporated by reference to: Japanese Patent Application No. 7-277484, filed Oct. 25, 1995 and Japanese Patent Application No. 8-17482, filed Feb. 2, 1995.

BACKGROUND OF THE INVENTION

The present invention concerns a lenticular sheet which is suitable for use in the construction of a rear-projection screen (used in liquid crystal projection TV sets) in combination with a Fresnel lens sheet.

In particular, the present invention concerns a lenticular sheet [a] which has a simple construction in which lens parts are formed on one side only, [b] in which lens parts comprising convex cylindrical lenses formed side by side can be formed at a fine pitch, and [c] in which a stripe-form light-blocking pattern (black stripe; hereafter referred to as "BS") formed in positions corresponding to the non-focusing parts of the respective cylindrical lenses can be accurately formed in the desired positions.

Description of the Related Art

Rear-projection screens generally include a combination of a Fresnel lens sheet and a lenticular sheet.

This lenticular sheet is generally constructed as follows: specifically, as is shown in FIG. 1, convex cylindrical lens surfaces are formed on both sides of the sheet, and projections are formed in the boundary areas between respective cylindrical lenses on one side of the sheet (i. e., the side from which projected light is emitted), with light-blocking layers (light-absorbing black stripes) being formed on the upper portions of said projections.

The reason that convex cylindrical lens surfaces are formed on both the front and back sides is that in cases where the projector is a three-tube CRT type projector, it is necessary to correct the aberration for three colors (R, G and B) with the lenses on the incident side.

In recent years, liquid crystal projection TV's have become popular, and there has been a demand for rear-projection screens in order to view the projected images of such TV's.

Liquid crystal projection TV's are constructed as shown in FIG. 2. Projected image light from a projector is projected onto a rear-projection screen via mirrors, and the observer view the projected image through said screen.

With increased definition of the projected image, the number of pixels in liquid crystal projectors has increased from the conventional number of several tens of thousands of pixels to a number exceeding one million pixels. As a result, there has been a demand for a finer pitch of the cylindrical lenses in lenticular sheets as well. As a result of this finer pitch, the moire phenomenon arising from the periodicity of the pixels of the liquid crystal projector and the periodicity of the cylindrical lenses is reduced.

In concrete terms, there is a need to reduce the pitch of current lenticular sheets (in which the cylindrical lenses are arranged at a pitch of around 0.7 mm) to a value of 0.3 mm or less.

Currently, lenticular sheets are obtained by subjecting a transparent thermoplastic resin sheet to press molding, or by molding both sides of the sheet at the same time that the sheet is formed by melt extrusion. However, in the case of various methods used for the molding of thermoplastic resins, it is extremely difficult to obtain the above-mentioned fine pitch. The reason for this is that a nonuniform temperature distribution is generated during cooling following the hot molding process, so that heat recovery phenomena characteristic of plastics occur: i. e., warping of the molded sheet may occur, or nonuniform heat shrinkage may take place.

Various molding methods using ultraviolet (or electron beam) curable resins are known as desirable fabrication methods for molding lens sheets with a fine pitch; the following proposals have been disclosed:

(1) Japanese Patent Application Kokai No. 61-177215

This patent discloses a Fresnel lens (and method for fabricating the same) equipped with a transparent resin plate and an ultraviolet curable resin which is bonded to said transparent resin plate by polymerization, and which has Fresnel lens surfaces on the opposite side of said resin from said transparent resin plate, said lens being formed by pouring an ultraviolet curable resin into the space between a Fresnel lens mold and the aforementioned transparent resin plate.

(2) Japanese Patent Application Kokai No. 63-134227

In the method disclosed in this patent, a Fresnel lens mold is coated with an ultraviolet (or electron beam) curable resin, after which a film is laminated with said resin while defoaming is performed, and molding is performed by irradiation with ultraviolet light (or an electron beam). Next, the film (and resin) are removed from the mold and integrated with a transparent substrate.

The object of almost all molding methods using ultraviolet (electron beam) curable resins, as represented by the proposals described above, is the manufacture of Fresnel lens sheets, which have a relatively complicated shape compared to lenticular sheets. As of yet, there have been no proposals concerning the fabrication of lenticular sheets for use in rear-projection screens.

Furthermore, in cases where lenticular sheets molded by various methods are used as screens, BS patterns have conventionally been formed in order to improve the contrast.

Various types of printing methods such as offset, gravure or screen printing, etc., have customarily been used as methods for forming BS patterns. In the case of printing methods, however, printing plates which have a high positional precision (so that the image line parts are light-absorbing parts) must be prepared. Accordingly, in cases where the pitch of the cylindrical lenses is reduced, or the size of the lenticular sheet is increased, the preparation of printing plates and the alignment of said plates during printing become much more difficult.

The method described below is known as an example of a method (other than an ordinary printing method) for forming light-blocking patterns.

(3) Japanese Patent Application Kokai No. 59-121033

This patent discloses a method which allows a rear-projection screen on which a BS pattern with superior light-blocking properties is formed to be obtained easily and inexpensively, and without any need for a wet process, as follows: specifically, a positive type photosensitive adhesive agent (i. e., an adhesive agent which loses its adhesive properties when exposed to light) is installed on the viewing side of a rear-projection screen (lens sheet), and this adhesive agent is exposed (from the opposite side of the screen from said adhesive agent) by light projected from a projection light source (projector) or a light source which has an equivalent aperture, so that the adhesive properties of the focusing portions of the respective unit lenses of the lens sheet are eliminated, after which a light-blocking toner is applied from the viewing side, and is caused to adhere to the unexposed portions which retain adhesive properties. Afterward, the excess toner and the toner adhering to the aforementioned portions which have lost their adhesive properties as a result of exposure are removed.

SUMMARY OF THE INVENTION

The present invention concerns a lenticular sheet which is used in combination with a Fresnel lens sheet to form a screen used in a liquid crystal projection TV, said lenticular sheet being characterized by the fact that said sheet has a simple structure in which lens parts are formed on one side only, with a BS pattern being formed on the flat surface of the other side of said sheet.

Specifically, the object of the present invention is to provide a lenticular sheet which has finely pitched lens parts that are suitable for the viewing of a high-definition, high-image-quality liquid crystal projection TV, and in which an even more finely pitched BS pattern corresponding to said lens parts is accurately formed in desired positions, and a method for fabricating said lenticular sheet.

BRIEF DESCRIPTION OF THE DRAWINGS

FIG. 1 FIG. 1 is an explanatory diagram which illustrates a conventional lenticular sheet.

FIG. 2 FIG. 2 is an explanatory diagram which schematically illustrates the structure of a liquid crystal projection TV.

FIG. 7 FIG. 7 is an explanatory diagram which shows how the location of BS formation differs for each cylindrical lens in a case where exposure by means of divergent light is used to form the BS pattern on the flat surface of the lenticular sheet.

FIG. 8 FIG. 8 is an explanatory diagram which illustrates one example of the exposure device used for exposure formation of the BS pattern on the flat surface of the lenticular sheet.

FIG. 9 FIG. 9 is an explanatory diagram which illustrates the optical design of the lenticular sheet of the present invention.

FIG. 10 FIG. 10 is a graph which shows the relationship between the ratio of the thickness of the light-blocking pattern to the lens thickness (D'/D) and the aperture rate.

FIG. 11 FIG. 11 is a diagram of an ultraviolet-sensitive resin film.

FIG. 12 FIG. 12 illustrates attaching one layer of the ultraviolet-sensitive resin film of FIG. 11 to a support film of the lenticular sheet.

FIG. 13 FIG. 13 illustrates diagrammatically the formation of adhesive portions and non-adhesive portions of the ultraviolet-sensitive resin film of FIG. 11.

FIG. 14 FIG. 14 illustrates attaching a black transfer layer to the ultraviolet-sensitive film of FIG. 6 to form the BS pattern.

FIG. 15 FIG. 15 illustrates the BS pattern that is formed on the lenticular sheet.

FIG. 16 FIG. 16 illustrates possible non-uniform brightness of a screen surface.

DETAILED DESCRIPTION OF PREFERRED EMBODIMENTS

Figure 3:
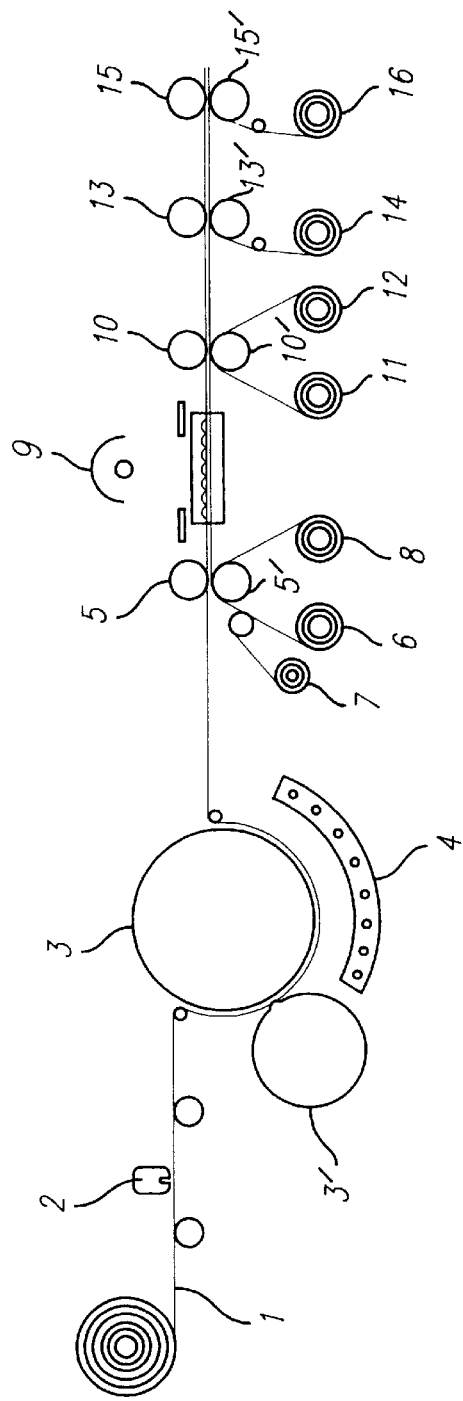
FIG. 3 FIG. 3 is an explanatory diagram which illustrates one example of a lenticular sheet fabricating device.

The present invention will be described with reference to the attached figures:

FIG. 3 shows one example of a device which continuously fabricates the lenticular sheet of the present invention.

This fabricating device is equipped with a coating device 2 which coats a film-form transparent support 1 (supplied from a roll) with an ultraviolet curable resin (UV curable resin), a lens forming roll 3 which has the inverted shapes of lenticular lenses formed on its surface, a pressing roll 3', an ultraviolet irradiation device 4, a pair of laminating rolls 5, 5' which laminate an ultraviolet-sensitive resin film 6 (supplied from a roll) with the support film on which the aforementioned lenticular lenses have been formed (with said ultraviolet-sensitive resin film 6 being laminated on the opposite side of the support film from the aforementioned lenses), an ultraviolet irradiation device 9, a pair of laminating rolls 10, 10' which are used for form a black transfer layer by means of a transfer sheet 11 supplied from a roll, a pair of laminating rolls 13, 13' which laminate a light-diffusing film 14 supplied from a roll, and a pair of laminating rolls 15, 15' which laminate a transparent resin film 16 (supplied from a roll) that has an anti-static function or an anti-reflection function, etc.

The above-mentioned fabricating device is ideal for the continuous fabrication of a lenticular sheet which uses a continuously supplied film as a support. However, the present invention is not limited to such a device; it would also be possible to accomplish lens formation using a stamper instead of a roll, and an individual sheet type fabricating device could also be used.

A lenticular sheet is manufactured as described below using the above-mentioned fabricating device.

A transparent resin film with ultraviolet transmissivity is desirable for use as the transparent support 1, and it is even more desirable that said support be subjected to a treatment which facilitates adhesion of a UV curable resin on the side of the support on which the aforementioned lens parts are formed. Materials which can be used for this support include polyethylene terephthalate (PET), polycarbonate (PC), or polyvinyl chloride (PVC).

There are no particular restrictions on the coating device 2 used to apply the aforementioned UV curable resin; however, a coating device such as a doctor blade or die coater, etc., is desirable.

The thickness of the UV curable resin coating formed on one side of the transparent support 1 varies according to the shape of the lenticular lenses being formed; however, a coating thickness of 0.1 mm to 0.2 mm is appropriate. Furthermore, the coating thickness may be adjusted in accordance with the viscosity of the resin and the feeding rate of the support film, etc.

Next, the support film which has been coated with the aforementioned UV curable resin is passed between lenticular lens forming rolls 3, 3' so that the shape of the lens forming roll 3 is transferred to the UV curable resin; at the same time, the resin is cured by ultraviolet irradiation from the ultraviolet irradiation device 4, so that lens parts 21 (not shown in the figure) are formed.

By forming the lens parts 21 from the aforementioned cured UV curable resin, it is possible to form a stable lens shape over the entire sheet even in the case of a lenticular sheet with a fine pitch of 0.3 mm or less.

The lens forming roll 3 which has inverted lenticular lens shapes formed on its surface can be obtained (for example) by installing a metal mold (worked by cutting), or a resin mold copied from such a metal mold by a prescribed method, on the surface of a roll.

Next, the support film on which the aforementioned lenticular lenses made with a UV curable resin have been formed is fed between a pair of laminating rolls 5, 5' so that an ultraviolet-sensitive resin film 6 fed from a roll is laminated with said support film on the opposite side of said support film from the aforementioned lenses.

A method which allows a BS pattern to be accurately formed in positions corresponding to non-focusing parts even in the case of a lenticular sheet which has finely pitched cylindrical lenses is proposed in the aforementioned Japanese Patent Application Kokai No. 59-121033, which is hereby incorporated by reference.

A BS pattern can be formed on the flat surface of the lenticular sheet by means of the above-mentioned proposed method in the present invention as well.

A film with characteristics which are such that the ultraviolet-exposed portions react to become non-adhesive while the unexposed portions remain adhesive is desirable for use as the above-mentioned ultraviolet-sensitive resin film 6.

For example, a film sold under the trademark Cromalin manufactured by DuPont may be used as the above-mentioned ultraviolet-sensitive resin film; this film is passed between laminating rolls 5, 5' heated to 110° C., and is laminated with the support film on the opposite side of said support film from the aforementioned lenses.

FIG. 11 is a diagram of the ultraviolet-sensitive resin film 6. Film 6 includes three layers: an exfoliation film 7, a positive type ultraviolet-sensitive agent 1110, and a protective film 8 superimposed on each other, as shown in FIG. 11. FIG. 12 illustrates passing the resin film 6 between the laminating rolls 5, 5'. The exfoliation film 7 as well as the protective film 8 are peeled away, such that only the adhesive agent 1110 adheres to support film with the lenticular lenses 1210.

Next, non-adhesive parts and adhesive parts corresponding respectively to the focusing parts and non-focusing parts based on the focusing effect of the lenticular lenses are formed in the ultraviolet-sensitive resin film by irradiation with ultraviolet light from the ultraviolet irradiation device 9, and a black transfer layer is transferred only to the aforementioned adhesive parts from a transfer sheet 11 (supplied from a roll) by passing the aforementioned film between the aforementioned pair of laminating rolls 10, 10' after the exfoliation film 7 and the protective film 8 have been peeled away from the surface of said film, so that a BS pattern 23 is formed.

FIG. 13 illustrates diagrammatically the formation of adhesive portions 1322 and non-adhesive portions 1318 of the ultra-violet sensitive resin film 6. In FIG. 13, light 1310 illuminates the lenticular lenses 1314. These lenticular lenses 1314 focus the light away from some regions and towards other regions of agent 1110 of the ultraviolet-sensitive resin film 6. The regions onto which ultraviolet light 1310 is focused become the non-adhesive portions 1318. The regions from which the ultraviolet light 1310 is focused away, are the adhesive portions 1322. Then, the BS pattern 23 is formed on the adhesive regions 1322.

FIG. 14 illustrates the process of attaching a black transfer layer 1410 to the agent 1110 of the ultraviolet-sensitive film 6 to form the BS pattern 23. As shown in FIG. 14, the transfer sheet 11 includes a black transfer layer 1410 as well as a support film 12. The black transfer layer 1410 may be made by combining carbon black with a dispersing resin. The support film 12 can be, for example, acrylic resin.

The BS pattern 23 is formed due to the action of the laminating wheels 10, 10'. The black transfer layer 1410 is thermoplastically bound to the adhesive regions 1322, but not to the non-adhesive regions 1318. FIG. 15 illustrates the BS pattern 23 that is formed on the lenticular sheet due to the action of laminating wheels 10, 10'.

The above-mentioned BS pattern is formed on the flat surface of the lenticular sheet which is located on the side of the observer. Accordingly, in order to form focusing parts in positions which are the same as in the case of actual screen use, it is necessary to perform the exposure process by means of parallel light over the entire surface of the lenticular sheet from the side of the cylindrical lenses.

In cases where the lenticular sheet is irradiated with divergent light instead of parallel light, as is shown in FIG. 7, there is a difference in the position of BS formation for the respective cylindrical lenses between the central portion of the lenticular sheet (directly in front of the light source) and the end portions of the lenticular sheet, due to a difference in the focusing position arising from the fact that the angle of incidence of the light source with respect to the cylindrical lenses is different.

In cases where a lenticular sheet with such as BS pattern is used as a rear-projection screen, a Fresnel lens sheet is present on the projection side; as a result, the following drawback arises: i. e., at the end portions of the screen, projected light strikes the BS so that there are missing portions in the projected image that is observed.

An exposure method of the type shown in FIG. 8 is effective for ultraviolet irradiation.

FIG. 8 is an explanatory diagram which illustrates a case in which the lenticular sheet is irradiated from the cylindrical lens side in a direction perpendicular to the flat surface of said lenticular sheet with band-form light extending in the direction of length of the cylindrical lenses (i. e., in the direction perpendicular to the plane of the paper in FIG. 8) while the light source and the lenticular sheet are caused to move relative to each other in the direction in which the cylindrical lenses are lined up side by side.

One possible method for obtaining the above-mentioned band-form light is to cause the light from the ultraviolet irradiation device 9 to pass through a slit 31 formed in a mask 30.

By using the above-mentioned exposure method, it is possible to achieve the accurate formation of a BS pattern in uniform positions for all of the cylindrical lenses, even in the case of a lenticular sheet in which the cylindrical lenses are arranged at a fine pitch.

For example, an ink foil sold under the trademark Cromalin manufactured by DuPont) is used for the pressure transfer of the BS pattern 23; the line width of the BS pattern 23 can be adjusted in accordance with the amount of ultraviolet exposure and the feeding rate of the film.

Furthermore, as is shown in FIG. 10, by controlling the thickness of the BS pattern so that the aperture rate is 90% or greater (as indicated by the following equations, where P is the pitch of the convex cylindrical lenses, D is the thickness of the lenticular sheet, P' is the line width of the BS pattern and D' is the thickness of the BS pattern), it is possible to view the entire surface of the aperture through which the projected light passes without any blockage of the observational light path, not only from directly in front of the screen, but also in cases where the screen is viewed from a wide angle to the left or right. Thus, a screen which produces a bright image can be obtained.

$$\theta = \tan^{-1}\{(P-P')/2D\}$$

$$\theta' = \tan^{-1}\{(P-P')/2(D+D')\}$$

aperture rate=$(\theta-\theta')/\theta$

The above-mentioned aperture rate is the value obtained by subtracting the loss of transmitted light caused by the blockage of the projected light by the thickness of the BS pattern from 100%; this value has the ratio of the thickness of the light-blocking pattern to the lens thickness (D'/D) as a parameter.

The relationship between D'/D and the aperture rate is shown in a graph in FIG. 10.

It is seen from this graph that a screen with a bright image having an aperture rate of 90% or greater is obtained in cases where (D'/D) is 10% or less.

Furthermore, instead of laminating an ultraviolet-sensitive resin film 6 with the lenticular sheet, it would also be possible to coat said sheet with a liquid-form ultraviolet-sensitive resin which has similar characteristics.

Furthermore, the formation of a BS pattern by causing a powdered black toner to adhere only to the aforementioned adhesive portions (instead of transferring a black transfer layer) is also a modification which is within the scope of the present invention. However, in the case of a BS pattern formed by means of a toner, it is difficult to form stripes with sharp edges because of the shape of the toner particles; furthermore, the thickness of the BS pattern must be increased in order to obtain sufficient light-blocking properties.

Next, a light-diffusing film 14 supplied from a roll is laminated with the entire surface of the lenticular sheet (including the BS pattern 23) by means of the aforementioned pair of laminating rolls 13, 13'.

For example, material sold under the trademark YS300 manufactured by SOMAR CORPORATION is used as the material of the light-diffusing film 14, and lamination can be performed at ordinary temperatures by subjecting the side of the lenticular sheet to which the film 14 is to be laminated to an adhesive treatment.

FIG. 16 illustrates possible non-uniform brightness of a screen surface 1610. In the example of FIG. 16, the total thickness of the above-mentioned lenticular sheet 1622 endowed with a light diffusing function is about 1 mm. In FIG. 16, the light from a projector, is seen brightly only on part 1614 of the screen surface 1610, as seen by an observer watching the screen surface 1610. In the remaining parts 1618, the screen surface 1610 appears to an observer as relatively dark. In FIG. 16, the lenticular sheet 1622 without the light diffusing film 14 is about 0.6 mm thick. The lenticular sheet's 1622 lens parts 21 are about 0.1 mm thick and its transparent support 1 is about 0.5 mm thick.

If instead of the above-mentioned light-diffusing film 14, the thickness of the light-diffusing sheet is 0.5 mm or greater, then the above-mentioned phenomenon of FIG. 16 is canceled. In other words, to an observer all of the screen surface 1610 of FIG. 16 will appear bright.

The above-mentioned light-diffusing sheet 14 can be obtained by mixing a light-diffusing chemical, for example, an inorganic substance, such as $TiO_2$ or $SiO_2$ into a transparent resin sheet. When the thickness of the light diffusing film 14 is 0.5 mm or greater, the light-diffusing property is easily controlled, because the grain diameter of the light diffusing chemical is less restricted. So, for thicker light-diffusing films 14, it is easier to avoid dark parts 1618 than for thinner light-diffusing films 14, such as those with a thickness less than 0.5 mm.

Finally, depending on the intended use of the sheet, a transparent resin film 16 endowed with an anti-static function or an anti-reflection function may be laminated with the lenticular sheet by means of the aforementioned pair of laminating rolls 15, 15'.

A transparent resin film 16 with an anti-static function can be obtained by a method in which a nonionic, anionic or cationic surfactant is kneaded into a film, a method in which such a surfactant is mixed with a binder and applied to the surface of a film as a coating, or a method in which a substance endowed with conductivity (e. g., indium oxide doped with tin oxide) is vacuum-evaporated on the surface of a film so that a conductive coating film is formed, etc.

A transparent resin film 16 with an anti-reflection function can be obtained by mixing a powdered inorganic substance, such as $SiO_2$, $Al_2O_3$ or $CaCO_3$, with a binder to form a paint, coating the surface of a film with said paint, and laminating a non-glare film which has a roughened surface.

By laminating the above-mentioned transparent resin film 16 with the lenticular sheet, it is possible to prevent the adhesion of dirt to the sheet due to static electricity, or to prevent glittering of the screen surface caused by the reflection of external light other than the projected image light, when the lenticular sheet is used as a screen. Furthermore, the lenticular sheet is endowed with rigidity, so that installation as a TV screen is facilitated.

Figure 4:
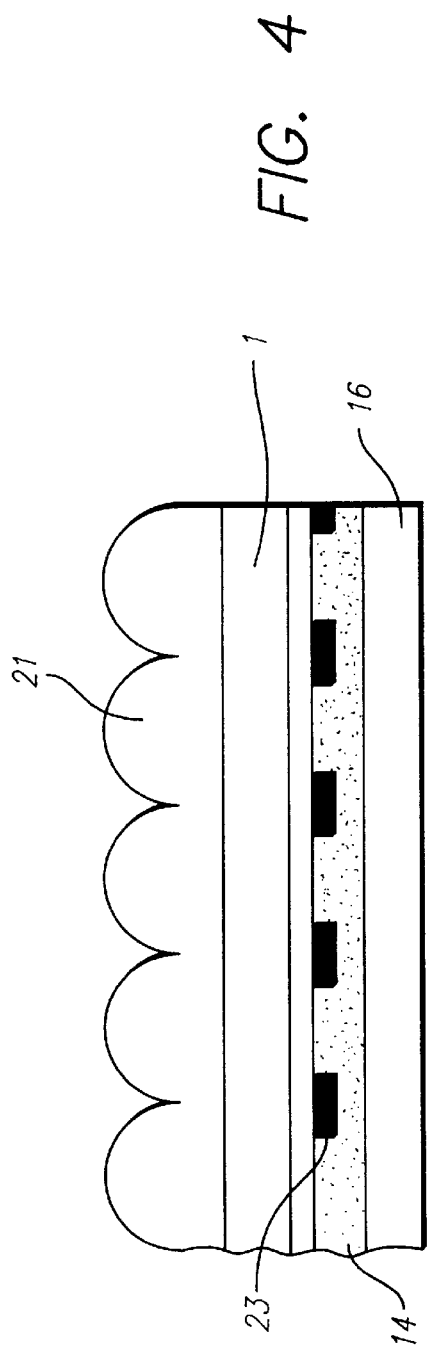
FIG. 4 FIG. 4 is a sectional explanatory diagram which illustrates one example of the lenticular sheet of the present invention.
Figure 5A:
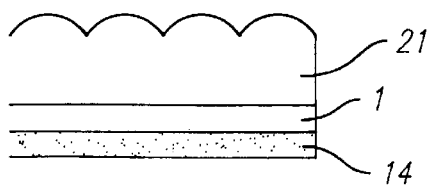
FIG. 5 FIG. 5 is a sectional explanatory diagram which illustrates another example of the lenticular sheet of the present invention.
Figure 5B:
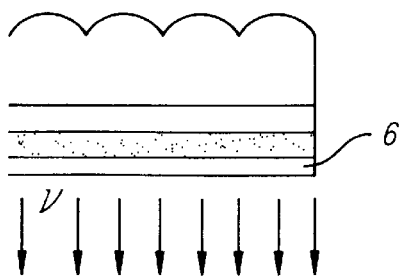
Figure 5C:
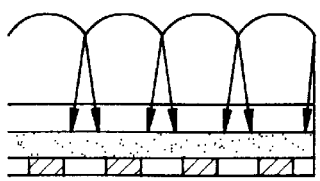
Figure 5D:
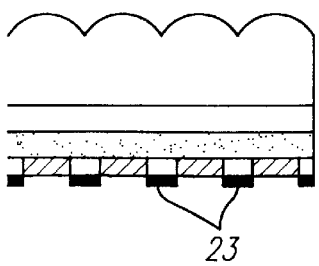

A lenticular sheet with the structure illustrated in the sectional explanatory diagram shown in FIG. 4 can be manufactured by the process described above.

Next, examples of lenticular sheets with other structures will be described.

<FIG. 5>Example in Which the Diffusing Layer is Not a Radiation Curable Resin

An inorganic compound such as $TiO_2$ or $SiO_2$, etc., is dispersed in and mixed with a transparent resin (binder) to form a coating material; this coating material is then applied to a film comprising a polyester resin, etc., thus forming a light-diffusing film.

The above-mentioned film is then bonded to the flat surface on the non-lens side of a lenticular sheet (in which lens parts 21 have been formed on one side of a transparent support 1 by means of a cured UV curable resin), thus forming a light-diffusing layer 14.

Alternatively, a light-diffusing layer may also be formed by applying the above-mentioned coating material directly to the flat surface of the lenticular sheet (FIG. 5 (*a*)) instead of applying said coating material to a film.

Next, an ultraviolet-sensitive resin 6 is laminated on the surface of the above-mentioned light-diffusing layer 14 (FIG. 5 (*b*)).

It is desirable that the ultraviolet-sensitive resin film 6 have characteristics which are such that the ultraviolet-exposed portions react to become non-adhesive, while the unexposed portions retain adhesive properties.

Non-adhesive parts and adhesive parts corresponding respectively to the focusing parts and non-focusing parts based on the focusing effect of the lenticular lenses are formed in the ultraviolet-sensitive resin film 6 by irradiation with ultraviolet light from an ultraviolet irradiation device (not shown in the figures).

Afterward, a black transfer layer is transferred only to the adhesive parts from a transfer sheet (supplied from a roll; not shown in the figures) by passing the lenticular sheet and said transfer sheet between a pair of laminating rolls (not shown in the figures), thus forming a BS pattern 23, as explained above with reference to FIG. 3. In FIG. 5, the focusing parts which constitute non-adhesive parts are indicated by shading, while the non-focusing parts which constitute adhesive parts are indicated as white parts (FIGS. 5 (c) through 5 (d)).

Ultraviolet light also reaches the photosensitive resin 6 via the light-diffusing layer 14; in this case, since the photosensitive parts spread out from the focusing parts as the amount of exposure (exposure intensity x exposure time), the width of the adhesive parts (i. e., the line width of the light-blocking pattern) can be adjusted according to the amount of exposure.

Finally, a transparent resin film 16 endowed with an anti-static function or an anti-reflection function is laminated as in the case of FIG. 4. In this case of this construction, the BS pattern 23 is exposed on the outermost surface of the lenticular sheet; accordingly, the transparent resin film 16 also acts to protect the BS pattern 23 (which would otherwise easily fall off) from the standpoint of handling.

Furthermore, the respective modifications described below are also within the scope of the present invention.

(1) A modification in which the photosensitive resin layer 6 is formed by coating the lenticular sheet with a liquid-form ultraviolet-sensitive resin with similar characteristics instead of using the aforementioned Cromalin film laminate.

(2) A modification in which the BS pattern is formed by causing a powdered black toner to adhere only to the aforementioned adhesive parts, instead of causing the transfer of a black transfer layer.

Figure 6A:
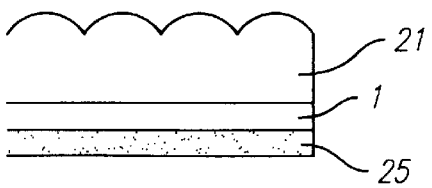
FIG. 6 FIG. 6 is a sectional explanatory diagram which illustrates another example of the lenticular sheet of the present invention.
Figure 6B:
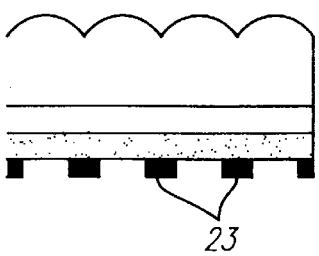

<FIG. 6>Example in Which the Diffusing Layer is a Radiation Curable Resin

In FIG. 5, the light-diffusing layer 14 and the photosensitive resin layer 6 were formed as separate layers; however, it would also be possible to combine both of these layers into a single layer by endowing a photosensitive resin with a diffusing function.

Various types of photosensitive resins may be used; generally, however, resins which have acryloyl groups in the molecule are used. Specifically, oligomers, such as epoxy acrylate, urethane acrylate, polyester acrylate or polyol acrylate oligomers, or polymer-oligomer mixtures including such polymers and methacrylic monomers which have monofunctional, bifunctional or multifunctional groups (e.g., tetrahydrofurfuryl acrylate, polyethylene glycol diacrylate or trimethylolpropane triacrylate) are used.

Using the above-mentioned photopolymers as binders, coating materials are formed by dispersing and mixing powdered inorganic compounds, such as $TiO_2$, $SiO_2$, $CaCO_3$ or $Al_2O_3$, as diffusing agents.

In addition, additives, such as photopolymerization initiators, surfactants or defoaming agents, may be added if necessary.

The above-mentioned coating material is applied to the flat surface on the non-lens side of the lenticular sheet (in which lens parts 21 have been formed by means of a cured UV curable resin on one side of a transparent support 1), thus forming a photosensitive diffusing layer 25 (FIG. 6 (a)); afterward, a BS pattern 23 is formed in the same manner as described above (FIG. 6 (b)).

By using such a light-diffusing layer 25 which has photosensitivity (made with a radiation curable resin in which a powdered inorganic compound is dispersed and mixed), it is possible to simplify the layer structure of the lenticular sheet.

What is claimed is:

1. A lenticular sheet comprising:
   lens parts comprising convex cylindrical lenses formed side by side with a radiation curable resin on one side of a transparent support;
   a striped light-blocking pattern formed in positions corresponding to the non-focusing parts of the respective cylindrical lenses on a flat surface located on the opposite side of the aforementioned support; and
   a light-diffusing layer formed on top of the aforementioned light-blocking pattern.

2. A lenticular sheet, as defined in claim 1, wherein the aforementioned lens parts comprise convex cylindrical lenses installed side by side at a pitch of 0.3 mm or less.

3. A lenticular sheet, as defined in claim 1, wherein the aperture rate is 90% or greater as indicated by the following equations, where P is the pitch of the convex cylindrical lenses, D is the thickness of the lenticular sheet, P' is the line width of the stripe-form light-blocking pattern and D' is the thickness of the light-blocking pattern:

$$\theta = \tan^{-1}\{(P-P')/2D\}$$

$$\theta' = \tan^{-1}\{(P-P')/2(D+D')\}$$

aperture rate=$(\theta-\theta')/\theta$.

4. A lenticular sheet, as defined in claim 1, wherein the aforementioned light-blocking pattern comprises a black transfer layer which is formed on adhesive parts constituting non-focusing parts of a positive photosensitive adhesive layer.

5. A lenticular sheet, as defined in claim 1, in which a film with an anti-static function is further laminated on the outermost surface of said sheet on the opposite side of said sheet from the aforementioned lens parts.

6. A lenticular sheet, as defined in claim 1, in which a film with an anti-reflection function is further laminated on the outermost surface of said sheet on the opposite side of said sheet from the aforementioned lens parts.

7. A rear-projection screen which is constructed by combining the lenticular sheet described in claim 1 with a Fresnel lens sheet.

8. A rear-projection TV which is equipped with the screen described in claim 7.

9. A lenticular sheet comprising;
   lens parts comprising convex cylindrical lenses formed side by side with a radiation curable resin on one side of a transparent support;
   a light-diffusing layer formed over an entire flat surface located on the opposite side of the support; and
   a striped light-blocking pattern formed in positions corresponding to the non-focusing parts of the respective cylindrical lenses on top of the light-diffusing layer.

10. A lenticular sheet, as defined in claim 9, wherein the aforementioned lens parts comprise convex cylindrical lenses installed side by side at a pitch of 0.3 mm or less.

11. A lenticular sheet, as defined in claim 9, wherein the aperture rate is 90% or greater as indicated by the following equations, where P is the pitch of the convex cylindrical lenses, D is the thickness of the lenticular sheet, P' is the line width of the stripe-form light-blocking pattern and D' is the thickness of the light-blocking pattern:

$$\theta = \tan^{-1}\{(P-P')/2D\}$$

$$\theta' = \tan^{-1}\{(P-P')/2(D+D')\}$$

aperture rate=$(\theta-\theta')/\theta$.

12. A lenticular sheet, as defined in claim 9, wherein the aforementioned light-blocking pattern comprises of a black transfer layer which is formed on adhesive parts constituting non-focusing parts of a positive photosensitive adhesive layer.

13. A lenticular sheet, as defined in claim 9, wherein the aforementioned light-diffusing layer comprises a radiation curable resin in which a powdered inorganic compound is dispersed and mixed.

14. A lenticular sheet, as defined in claim 9, in which a film with an anti-static function is further laminated on the outermost surface of said sheet on the opposite side of said sheet from the aforementioned lens parts.

15. A lenticular sheet as defined in claim 9, further comprising a film with an anti-reflection function is further laminated on the outermost surface of said sheet on the opposite side of said sheet from the lens parts.

16. A rear-projection screen which is constructed by combining the lenticular sheet described in claim 9 with a Fresnel lens sheet.

17. A rear-projection TV which is equipped with the screen described in claim 15.

18. A method for fabricating a lenticular sheet, the method comprising the following steps:
   (a) applying a radiation curable resin in which a powdered inorganic compound has been dispersed and mixed as a coating, to the flat surface of a lenticular sheet wherein the lenticular sheet comprises convex cylindrical lens parts formed side by side within the radiation curable resin on one side and a flat surface on the opposite side;
   (b) curing by irradiation the radiation curable resin of one or more portions of the lens parts of the lenticular sheet; and
   (c) blackening the aforementioned resin of the lens parts side of the lenticular sheet at portions other than the one or more aforementioned portions cured by irradiation.

* * * * *

(12) EX PARTE REEXAMINATION CERTIFICATE (5048th)
United States Patent
Saitoh et al.

(10) Number: US 5,870,224 C1
(45) Certificate Issued: Dec. 28, 2004

(54) LENTICULAR SHEET, REAR-PROJECTION SCREEN OR TV USING THE SAME, AND FABRICATION METHOD FOR SAID LENTICULAR SHEET

(75) Inventors: Goro Saitoh, Tokyo (JP); Teruo Suzuki, Tokyo (JP); Takashi Abe, Tokyo (JP); Kazuyoshi Ebina, Tokyo (JP)

(73) Assignee: Toppan Printing Company Limited, Tokyo (JP)

Reexamination Request:
No. 90/006,112, Sep. 20, 2001

Reexamination Certificate for:
Patent No.: 5,870,224
Issued: Feb. 9, 1999
Appl. No.: 08/735,921
Filed: Oct. 24, 1996

(30) Foreign Application Priority Data

Oct. 25, 1995 (JP) ............................................. 7-277484
Feb. 2, 1996 (JP) ............................................. 8-017482

(51) Int. Cl.$^7$ .............................................. G03B 21/60
(52) U.S. Cl. ...................................... 359/456; 359/455
(58) Field of Search ................................ 359/443, 455, 359/456, 457, 460, 619

(56) References Cited

U.S. PATENT DOCUMENTS 5,066,099 A * 11/1991 Yoshida et al. .............. 359/457
5,668,662 A * 9/1997 Magocs et al. .............. 359/443

FOREIGN PATENT DOCUMENTS

| JP | 49-66136 | * | 6/1974 | |
| JP | 50 136028 | * | 10/1975 | ............ G03B/21/56 |
| JP | 58221833 | | 12/1983 | |
| JP | 59121033 A | * | 7/1984 | ............ G03B/21/62 |
| JP | 60017434 | | 1/1985 | |
| JP | 62236282 | | 10/1987 | |
| JP | 63265235 | | 11/1988 | |
| JP | 02135431 A | * | 5/1990 | ............ G03B/21/62 |
| JP | 3-64701 | * | 3/1991 | ............ G03B/21/62 |
| JP | 3127041 | | 5/1991 | |
| JP | 03127041 A | * | 5/1991 | ............ G03B/21/62 |
| JP | 3168630 | | 7/1991 | |
| JP | 3181934 | | 8/1991 | |
| JP | 3220542 | | 9/1991 | |
| JP | 4270334 | | 9/1992 | |
| JP | 4340534 | | 11/1992 | |
| JP | 04340534 A | * | 11/1992 | ............ G03B/21/62 |
| JP | 6059341 | | 3/1994 | |
| JP | 6222463 | | 8/1994 | |
| JP | 6332075 | | 12/1994 | |
| JP | 07028170 A | * | 1/1995 | ............ G03B/21/62 |
| JP | 7092446 | | 4/1995 | |
| JP | 743712 | | 10/1995 | |
| JP | 8101459 | | 4/1996 | |

OTHER PUBLICATIONS

English translation of Japanese Patent Publication 2–135, 431.
English translation of Japanese Patent Publication 59–121033.

* cited by examiner

Primary Examiner—Christopher E. Mahoney

(57) ABSTRACT

The present invention provides a lenticular sheet in which cylindrical lens parts including a radiation curable resin are formed on one side of a transparent support, and at least a light-diffusing layer and light-blocking stripes are formed on the flat surface located on the opposite side of said sheet. Cylindrical lens parts with a fine pitch of 0.3 mm or less can be obtained; furthermore, finely pitched light-blocking stripes can be accurately formed in the desired positions.

A projection screen constructed by combining the aforementioned lenticular sheet with a Fresnel lens sheet is ideally suited for viewing a liquid crystal projection TV with a high image definition.

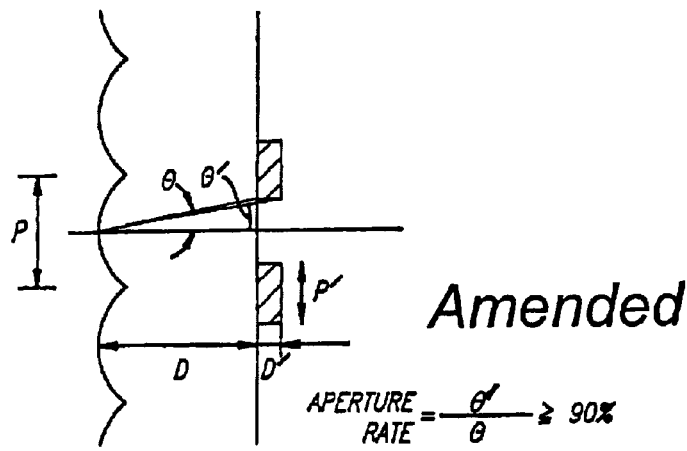

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7, lines 15–18:

$\theta = \tan^{-1}\{(P-P')/2D\}$ $\theta' = \tan^{-1}\{(P-P')/2(D+D')\}$ aperture rate = $([\theta-]\theta')/\theta$

THE DRAWING FIGURES HAVE BEEN CHANGED AS FOLLOWS:

$\theta-\theta'/\theta$ was changed to $\theta'/\theta$ in order to conform with the specification as well as the amendment to the specification.

AS A RESULT OF REEXAMINATION, IT HAS BEEN DETERMINED THAT:

The patentability of claims 1, 2, 4, 5, 6, 7, 8, 9, 10, 12, 13, 14, 15, 16 and 17 is confirmed.

Claims 3, 11 and 18 are determined to be patentable as amended.

New claims 19–82 are added and determined to be patentable.

3. A lenticular sheet, as defined in claim 1, wherein the aperture rate is 90% or greater as indicated by the following equations, where P is the pitch of the convex cylindrical lenses, D is the thickness of the lenticular sheet, P' is the line width of the stripe-form light-blocking pattern and D' is the thickness of the light-blocking pattern:

$\theta = \tan^{-1}\{(P-P')/2D\}$ $\theta' = \tan^{-1}\{(P-P')/2(D+D')\}$ aperture rate = $([\theta-]\theta')/\theta$.

11. A lenticular sheet, as defined in claim 9, wherein the aperture rate is 90% or greater as indicated by the following equations, where P is the pitch of the convex cylindrical lenses, D is the thickness of the lenticular sheet, P' is the line width of the stripe-form light-blocking pattern and D' is the thickness of the light-blocking pattern:

$\theta = \tan^{-1}\{(P-P')/2D\}$ $\theta' = \tan^{-1}\{(P-P')/2(D+D')\}$ aperture rate = $([\theta-]\theta')/\theta$.

18. A method for fabricating a lenticular sheet, the method comprising the following steps:

(a) applying [a] *one* radiation curable resin in which a powdered inorganic compound has been dispersed and mixed as a coating, to [the] *a* flat surface of a lenticular sheet, *wherein the lenticular sheet comprises convex cylindrical lens parts formed side by side* [within the ] *with another* radiation curable resin on one side and [a] *the* flat surface on the opposite side;

(b) curing by irradiation *one or more portions of* the *one* radiation curable resin [of] *corresponding to* one or more portions of the lens parts of the lenticular sheet; and (c) blackening the aforementioned *one radiation curable* resin [of] *on* the [lens parts] *flat* side of the lenticular sheet at portions other than the one or more aforementioned portions *of the one radiation curable resin* cured by irradiation.

19. *A lenticular sheet of claim 1, wherein the striped light blocking pattern is formed of a black transfer layer which has been transferred to the flat surface at the non-focusing parts.*

20. *A lenticular sheet of claim 19, wherein the black transfer layer comprises carbon black and a dispersing resin.*

21. *A lenticular sheet of claim 20, wherein the black transfer layer does not comprise toner.*

22. *A lenticular sheet of claim 20, wherein the black transfer layer is transferred to the non-focusing parts on the opposite side of the transparent substrate by a process in which light is focused by the lens parts so as to define corresponding boundaries on the opposite side between focusing parts and the non-focusing parts, and the light blocking pattern extends from the boundaries of corresponding non-focusing parts.*

23. *A lenticular sheet of claim 1, wherein the light blocking pattern is formed of a light blocking material disposed on the non-focusing parts on the opposite side of the transparent substrate by a process in which light is focused by the lens parts so as to define corresponding boundaries on the opposite side between focusing parts and the non-focusing parts, and the light blocking pattern extends from the boundaries of corresponding non-focusing parts.*

24. *A lenticular sheet of claim 23, wherein the light blocking material comprises a black transfer layer.*

25. *A lenticular sheet of claim 23, wherein the light blocking material comprises an ink foil.*

26. *A lenticular sheet of claim 23, wherein the light blocking material comprises a layer including carbon black.*

27. *A lenticular sheet of claim 23, wherein the light blocking material comprises toner.*

28. *A lenticular sheet of claim 3, wherein the light blocking pattern is formed of a light blocking material disposed on the non-focusing parts on the opposite side of the transparent substrate by a process in which light is focused by the lens parts so as to define corresponding boundaries on the opposite side between focusing parts and the non-focusing parts, and the light blocking pattern extends from the boundaries of corresponding non-focusing parts.*

29. *A lenticular sheet of claim 28, wherein the light blocking material comprises a black transfer layer.*

30. *A lenticular sheet of claim 28, wherein the light blocking material comprises an ink foil.*

31. *A lenticular sheet of claim 28, wherein the light blocking material comprises a layer including carbon black.*

32. *A lenticular sheet of claim 31, wherein the light blocking pattern comprises the carbon black combined with a dispersing resin.*

33. *A method of claim 18, wherein the blackening the aforementioned one resin comprises focusing light using the lens parts so as to define corresponding boundaries on the*

*flat surface of the lenticular sheet between focusing parts and the non-focusing parts, and the light blocking pattern extends from the boundaries of corresponding non-focusing parts.*

34. A method of claim 33, wherein the light blocking pattern comprises a black transfer layer.

35. A method of claim 33, wherein the light blocking pattern comprises an ink foil.

36. A method of claim 33, wherein the light blocking pattern comprises a layer including carbon black.

37. A method of claim 36, wherein the light blocking pattern comprises the carbon black combined with a dispersing resin.

38. A method of claim 33, wherein the light blocking pattern comprises a black transfer layer.

39. A method of claim 18, wherein the blackening the aforementioned one resin comprises focusing light using the lens parts so as to define corresponding boundaries on a flat surface of the one radiation curable resin, and the light blocking pattern extends from the boundaries of corresponding non-focusing parts.

40. A lenticular sheet of claim 1, which is combined with a Fresnel lens sheet to constitute a transmission type screen through which light is projected by a single projector.

41. A lenticular sheet, as defined in claim 40, wherein the aforementioned lens parts comprise convex cylindrical lenses installed side by side at a pitch of 0.3 mm or less.

42. A lenticular sheet, as defined in claim 40, wherein the aperture rate is 90% or greater as indicated by the following equations, where P is the pitch of the convex cylindrical lenses, D is the thickness of the lenticular sheet, P' is the line width of the stripe-form light-blocking pattern and D' is the thickness of the light-blocking pattern:

$\theta = \tan^{-1}\{(P-P')/2D\}$ $\theta' = \tan^{-1}\{(P-P')/2(D+D')\}$ aperture rate = $(\theta')/\theta$.

43. A lenticular sheet, as defined in claim 40, wherein the aforementioned light-blocking pattern comprises a black transfer layer which is formed on adhesive parts constituting non-focusing parts of a positive photosensitive adhesive layer.

44. A lenticular sheet, as defined in claim 40, in which a film with an anti-static function is further laminated on the outermost surface of said sheet on the opposite side of said sheet from the aforementioned lens parts.

45. A lenticular sheet, as defined in claim 40, in which a film with an anti-reflection function is further laminated on the outermost surface of said sheet on the opposite side of said sheet from the aforementioned lens parts.

46. A rear-projection screen which is constructed by combining the lenticular sheet described in claim 40 with the Fresnel lens sheet.

47. A rear-projection TV which is equipped with the screen described in claim 46.

48. A lenticular sheet of claim 1, wherein the light-blocking pattern is black and comprises carbon black.

49. A lenticular sheet, as defined in claim 48, wherein the aforementioned lens parts comprise convex cylindrical lenses installed side by side at a pitch of 0.3 mm or less.

50. A lenticular sheet, as defined in claim 48 wherein the aperture rate is 90% or greater as indicated by the following equations, where P is the pitch of the convex cylindrical lenses, D is the thickness of the lenticular sheet, P' is the line width of the stripe-form light-blocking pattern and D' is the thickness of the light-blocking pattern:

$\theta = \tan^{-1}\{(P-P')/2D\}$ $\theta' = \tan^{-1}\{(P-P')/2(D+D')\}$ aperture rate = $(\theta')/\theta$.

51. A lenticular sheet, as defined in claim 48, wherein the aforementioned light-blocking pattern comprises a black transfer layer which is formed on adhesive parts constituting non-focusing parts of a positive photosensitive adhesive layer.

52. A lenticular sheet, as defined in claim 48, in which a film with an anti-static function is further laminated on the outermost surface of said sheet on the opposite side of said sheet from the aforementioned lens parts.

53. A lenticular sheet, as defined in claim 48, in which a film with an anti-reflection function is further laminated on the outermost surface of said sheet on the opposite side of said sheet from the aforementioned lens parts.

54. A rear-projection screen which is constructed by combining the lenticular sheet described in claim 48 with a Fresnel lens sheet.

55. A rear-projection TV which is equipped with the screen described in claim 54.

56. A lenticular sheet of claim 1, wherein:

an ultraviolet-sensitive layer, which is adhesive before being exposed to light and is non-adhesive after being exposed to the light, is formed on the flat surface located on the opposite side of the transparent support, and the light-blocking pattern is in a stripe-form on a surface of the ultraviolet-sensitive layer at positions other than non-adhesive portions of the ultraviolet-sensitive layer and which were made non-adhesive through the exposure to the light.

57. A lenticular sheet of claim 56, wherein the light-blocking pattern is black.

58. A lenticular sheet of claim 56, wherein the light-blocking pattern is a transfer layer.

59. A lenticular sheet of claim 56, wherein the light-blocking pattern contains carbon black.

60. A lenticular sheet of claim 56, wherein the light-blocking pattern contains a toner.

61. A lenticular sheet of claim 1, wherein the light diffusing layer is a light diffusing film.

62. A lenticular sheet of claim 61, wherein a thickness of the light diffusing layer is at or greater than 0.5 mm.

63. A lenticular sheet of claim 61, wherein the light-blocking pattern is black.

64. A lenticular sheet of claim 61, wherein the light-blocking pattern is a transfer layer.

65. A lenticular sheet of claim 61, wherein the light-blocking pattern contains carbon black.

66. A lenticular sheet of claim 61, wherein the light-blocking pattern contains a toner.

67. A lenticular sheet of claim 1, wherein the radiation curable resin layer is formed on the one side of the transparent support;

the lens parts are formed in the radiation curable resin layer using a lens forming mold with a reverse shape of the lenses to be formed, and the formed lens parts are cured by radiation;

an ultraviolet-sensitive layer is formed on the flat surface on the opposite side of the transparent support, the opposite side being opposite the one side on which are formed the lens parts;

ultraviolet light is emitted and received through the lens parts so as to define the focusing parts and the non-focusing parts on the ultraviolet-sensitive layer;

the light-blocking pattern is formed on the non-focusing parts of the ultraviolet-sensitive layer; and the light-diffusing pattern is formed on parts corresponding to the non-focusing parts of the ultraviolet-sensitive layer.

68. A lenticular sheet of claim 67, wherein the ultraviolet light incident to the lens parts is parallel.

69. A lenticular sheet of claim 67, wherein the transparent support is a continuous film.

70. A lenticular sheet of claim 67, wherein the ultraviolet-sensitive resin layer is an adhesive photosensitive resin film.

71. A lenticular sheet of claim 67, wherein a thickness of the radiation curable layer is between 0.1 mm and 0.2 mm.

72. A lenticular sheet of claim 67, wherein a pitch of the lens parts is less than 0.3 mm.

73. A lenticular sheet of claim 67, wherein the forming of the lens parts by the lens forming molding and the curing of the radiation curable layer by radiation are performed at the same time.

74. A lenticular sheet of claim 67, wherein the light-blocking pattern is a black transfer layer.

75. A lenticular sheet of claim 67, wherein the light diffusing layer is a film.

76. A lenticular sheet of claim 2, wherein the pitch is at or below 0.2 mm.

77. A lenticular sheet of claim 76, wherein the pitch is at or below 0.155 mm.

78. A lenticular sheet of claim 77, wherein the pitch is at or below 0.1 mm.

79. A lenticular sheet of claim 3, wherein the aforementioned lens parts comprise convex cylindrical lenses installed side by side at a pitch of 0.3 mm or less.

80. A lenticular sheet of claim 79, wherein the pitch is at or below 0.2 mm.

81. A lenticular sheet of claim 80, wherein the pitch is at or below 0.155 mm.

82. A lenticular sheet of claim 81, wherein the pitch is at or below 0.1 mm.

* * * * *